United States Patent
Yamasaki et al.

(10) Patent No.: US 10,581,366 B2
(45) Date of Patent: Mar. 3, 2020

(54) CALCULATION APPARATUS AND PROCESSING APPARATUS

(71) Applicant: RENESAS ELECTRONICS CORPORATION, Tokyo (JP)

(72) Inventors: Reiji Yamasaki, Tokyo (JP); Yoshitaro Kondo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 108 days.

(21) Appl. No.: 15/979,005

(22) Filed: May 14, 2018

(65) Prior Publication Data
US 2019/0006978 A1 Jan. 3, 2019

(30) Foreign Application Priority Data
Jun. 29, 2017 (JP) .................................. 2017-127794

(51) Int. Cl.
| | | |
|---|---|---|
| H02P 27/08 | (2006.01) | |
| H02M 7/5387 | (2007.01) | |
| H02M 1/08 | (2006.01) | |
| H02P 6/16 | (2016.01) | |
| H02M 1/00 | (2006.01) | |

(52) U.S. Cl.
CPC ............ *H02P 27/085* (2013.01); *H02M 1/08* (2013.01); *H02M 7/53871* (2013.01); *H02P 6/16* (2013.01); *H02M 2001/0009* (2013.01)

(58) Field of Classification Search
USPC ..................................................... 318/400.1
See application file for complete search history.

(56) References Cited

U.S. PATENT DOCUMENTS

| | | | |
|---|---|---|---|
| 6,356,219 B1* | 3/2002 | Weibel, IV | ........ G01D 5/24452 318/608 |
| 7,583,523 B2 | 9/2009 | Goto | |
| 8,427,089 B2 | 4/2013 | Suzuki | |
| 2009/0059446 A1* | 3/2009 | Matsui | ................. H02H 7/0805 361/31 |
| 2014/0117893 A1* | 5/2014 | Omata | .................... H02P 21/14 318/400.02 |
| 2014/0184114 A1* | 7/2014 | Omata | ...................... H02P 6/08 318/400.02 |
| 2016/0365819 A1* | 12/2016 | Masuda | .................. H02P 27/08 |

FOREIGN PATENT DOCUMENTS

| | | |
|---|---|---|
| JP | 2006-353073 A | 12/2006 |
| JP | 2012-065473 A | 3/2012 |

* cited by examiner

*Primary Examiner* — Jorge L Carrasquillo
(74) *Attorney, Agent, or Firm* — McDermott Will & Emery LLP

(57) ABSTRACT

A calculation apparatus 100 includes an encoder 101 configured to detect rising edges of PWM signals having at least three or more phases in each of the phases, and a register 103 configured to store, at a timing after the PWM signals having the respective phases rise and after AD conversion of a current value of a drive signal of a motor obtained by the PWM signals, a difference value between the AD-converted current value and a previous AD-converted current value for each phase.

4 Claims, 8 Drawing Sheets

CALCULATION APPARATUS AND PROCESSING APPARATUS

CROSS-REFERENCE TO RELATED APPLICATIONS

This application is based upon and claims the benefit of priority from Japanese patent application No. 2017-127794, filed on Jun. 29, 2017, the disclosure of which is incorporated herein in its entirety by reference.

BACKGROUND

The present disclosure relates to a calculation apparatus and a processing apparatus. For example, the present disclosure relates to a calculation apparatus and a processing apparatus for controlling a motor.

In related art, a three-phase brushless motor is known as a three-phase motor. The three-phase brushless motor has high durability because it has no brush to be worn out, and thus it has been widely used. The most common three-phase brushless motor generates rotational torque by applying a three-phase alternating current to a three-phase coil. Square waves have been widely used as the three-phase current because it is easy to fabricate a driving circuit with them. However, in recent years, sinusoidal waves have been used to control sinusoidal wave current drive to thereby achieve improved quietness and driving efficiency. Furthermore, vector control that precisely controls amplitude and phase of a three-phase sinusoidal current is becoming common.

For the vector control, it is necessary to detect a phase current for at least two phases. For example, Japanese Unexamined Patent Application Publication No. 2006-353073 discloses an inverter apparatus. In this inverter apparatus, a shunt resistor is provided between lower arm switching elements of two phases among the lower arm switching elements of three phases and a negative side of the DC power supply. The same ON periods are deleted in all three phases from ON periods of upper arm switching elements within a carrier cycle, and the phase current for two phases in the phases where the shunt resistors are provided are detected. Then, the inverter apparatus can detect a phase current with a compact size and with high vibration resistance without requiring development of complicated control software and without generating current distortion.

However, it is costly to use two current sensors in order to detect the phase current for two phases. To solve this problem, there is a method in which one current sensor detects a bus current between an inverter and a DC power supply, and reproduces an original phase current (at least for two phases) from the detected current. This method is referred to as one shunt current detection method (single shunt current detection method). In this one shunt current detection method, by sampling an output signal of the current sensor at appropriate timings, it is possible to detect the phase current of the phase at which a voltage level becomes maximum (maximum phase) and the phase current of the phase at which the voltage becomes minimum (minimum phase), i.e., to detect a current for two phases.

In the one shunt current detection method, the bus current appears only when one or two phases of PWM (Pulse Width Modulation) inverters among three-phases of PWM inverters are on. Thus, in order to obtain current levels for two phases from the bus current, it is necessary to sample two bus current levels, which are a bus current level in the section where only one phase is on, and the bus current level in the section where two phases are on. In the one shunt current detection method, the number of current sensors is reduced to one, so that the cost of the sensor is low.

However, since the three-phase PWM pulses are PWM-modulated three-phase sinusoidal currents, the two pulse widths may be close to or equal to each other. The bus current section to be sampled is very short in the vicinity of the timing at which the two pulse widths are close to or equal to each other. Thus, the maximum phase of the voltage and the intermediate phase come close to each other, or the minimum phase and the intermediate phase of the voltage come close to each other, thereby disabling the current for two phases to be detected.

Japanese Unexamined Patent Application Publication No. 2012-65473 discloses a method of determining a size relation of the voltage levels of three phases corresponding to the pulse widths of three phases, rearranging the voltage levels of the pulse widths in a descending order of the pulse width, deciding a shift amount of the pulse that can detect a current for two phases, detecting a current from the shifted pulse waveform to decide a timing for AD conversion, and evaluating which phase the detected current is in from the pulse waveform. By doing so, a current for two phases is detected in such a way that the two PWM pulse widths do not come close to each other.

SUMMARY

However, in Japanese Unexamined Patent Application Publication No. 2012-65473, the amount of calculation in each process is large, and thus there is a problem that it takes time to obtain a drive current value of each phase, and that a control cycle becomes long. Another problem is that a long control cycle of a motor causes stability of the control system to deteriorate.

Other problems of the related art and new features of the present disclosure will become apparent from the following descriptions of the specification and attached drawings.

An example aspect is a calculation apparatus that stores an AD-converted current value for each phase at a timing after the PWM having the respective phases rise and after AD conversion of a difference value between an inverter bus current value and a previous AD-converted current value at a timing specified by the PWM signals.

According to the above example aspect, it is possible to obtain a drive current value of each phase with a small amount of calculation in a short time, thereby reducing a control cycle.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
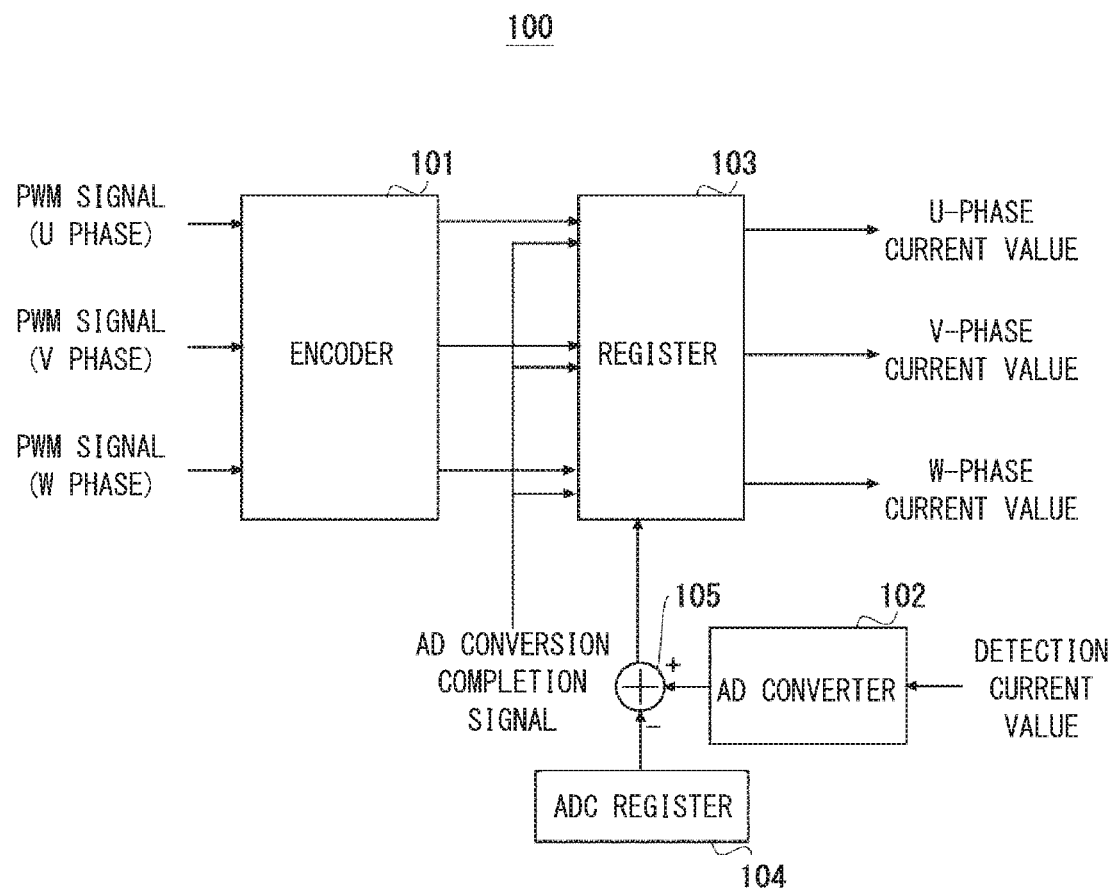
FIG. 1 is a block diagram showing a configuration of a calculation apparatus according to an overview of embodiments.

For the clarification of the description, the following description and the drawings may be omitted or simplified as appropriate. Further, each element shown in the drawings as functional blocks that perform various processing can be formed of a CPU (Central Processing Unit), a memory, and other circuits in hardware and may be implemented by programs loaded into the memory in software. Those skilled in the art will therefore understand that these functional blocks may be implemented in various ways by only hardware, only software, or the combination thereof without any limitation. Throughout the drawings, the same components are denoted by the same reference signs and overlapping descriptions will be omitted as appropriate.

(Overview of Embodiments)

FIG. 1 is a block diagram showing a configuration of a calculation apparatus according to an overview of the embodiments. In FIG. 1, the calculation apparatus 100 includes an encoder 101, an AD converter 102, a register 103, an ADC register 104, and a subtracted 105.

The encoder 101 detects rising edges of PWM signals having at least three or more phases in each of the phases. For example, since the PWM signal is a rectangular signal, the encoder 101 detects the rising edge of the signal when the PWM signal changes from a low voltage state to a high voltage state. Then, the encoder 101 outputs a result of the detection to the register 103.

The AD converter 102 AD-converts an inverter bus current value at the timing specified by the PWM signals, and outputs the AD converted current value to the subtracted 105.

The ADC register 104 stores the AD-converted current value.

The subtracted 105 subtracts the current value stored in the ADC register 104 from the result output from the AD converter 102 and obtains a difference between the AD-converted current values. Then, the subtracted 105 outputs the difference between the AD-converted current values to the register 103.

The register 103 stores the difference between the AD-converted current values for each phase at the timing after the signals having respective phases rise and after the AD conversion of the current value of the driving signal of the motor obtained by the PWM signals.

As described above, the calculation apparatus according to the overview of the embodiments stores the difference between the AD-converted current values for the PWM signals having at least three or more phases at a timing after the signals having respective phases rise and after the AD conversion of the inverter bus current value at a timing specified by the PWM signals. By doing so, the calculation apparatus according to the overview of the embodiments can obtain the drive current value of each phase with a small amount of calculation in a short time.

First Embodiment

Figure 2:
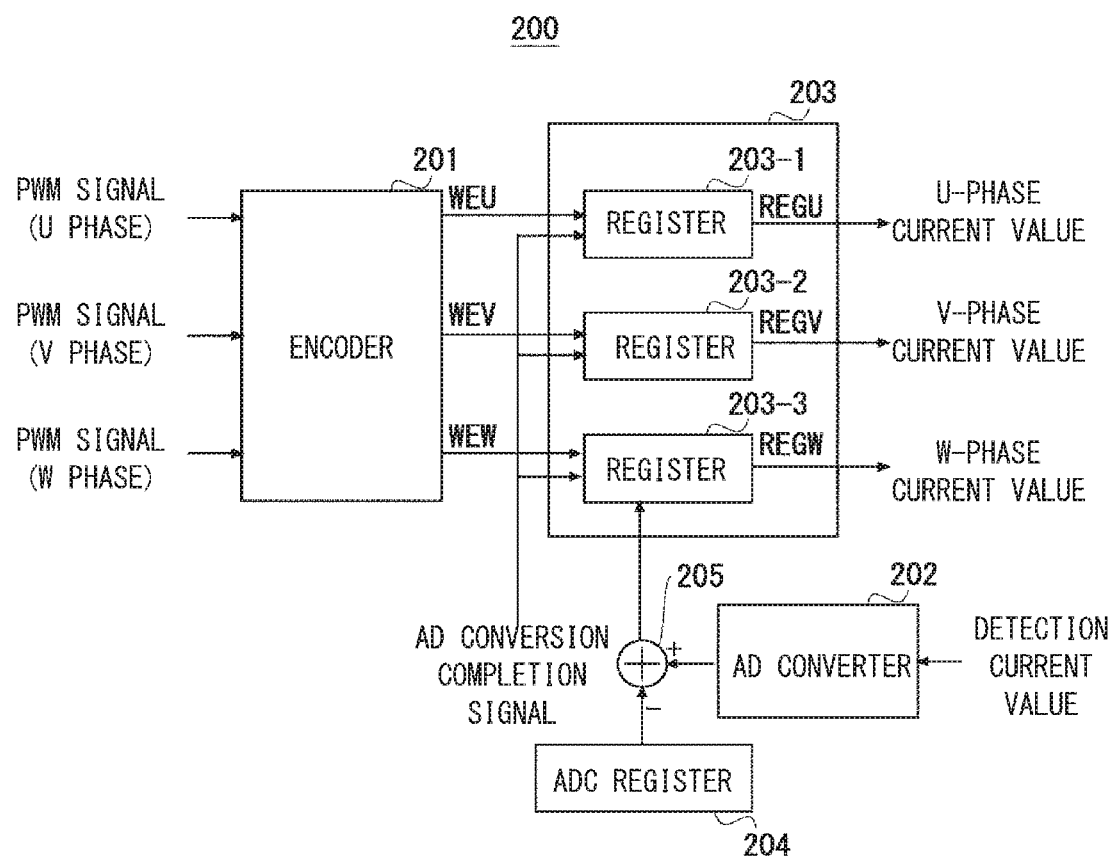
FIG. 2 is a block diagram showing a schematic configuration of a calculation apparatus according to a first embodiment.

FIG. 2 is a block diagram showing an overview configuration of the calculation apparatus according to a first embodiment. In FIG. 2, the calculation apparatus 200 detects drive current values of PWM signals having three phases in each of the phases and a drive current. In FIG. 2, the calculation apparatus 200 includes an encoder 201, an AD converter 202, a register 203, an ADC register 204, and a subtracted 205. In FIG. 2, the register 203 includes a register 203-1, a register 203-2, and a register 203-3.

The encoder 201 outputs a result WEU of detecting a rising edge of a U-phase PWM signal to the register 203-1. Likewise, the encoder 201 outputs a result WEV of detecting a rising edge of a V-phase PWM signal to the register 203-2. Further, the encoder 201 outputs a result WEW of detecting a rising edge of a W-phase PWM signal to the register 203-3.

The AD converter 202 AD-converts an inverter bus current value at the timing specified by the PWM signal, and outputs the AD-converted current value to the ADC register 204 and the subtracted 205.

The ADC register 204 stores the AD-converted current values. Then, the ADC register 204 outputs the stored current values to the subtracted 205.

The subtracted 205 subtracts the current value stored in the ADC register 204 from the result output from the AD converter 202. That is, the subtracted 205 subtracts the previous AD-converted current value from the current AD-converted current value to thereby obtain the difference between the AD-converted current values. Then, the subtracted 205 outputs the difference between the AD-converted current values to the register 203-1, the register 203-2, and the register 203-3.

The register 203-1 stores the difference between the AD-converted current values at the timing after the U phase signal rises and after the AD conversion of the current value of the drive signal of the motor obtained by the PWM signal. Likewise, the register 203-2 stores the difference between the AD-converted current values at the timing after the V phase signal rises and after the AD conversion of the current value of the drive signal of the motor obtained by the PWM signal. Likewise, the register 203-3 stores the difference between the AD-converted current values at the timing after the W phase signal rises and after the AD conversion of the current value of the drive signal of the motor obtained by the PWM signal.

Figure 3:
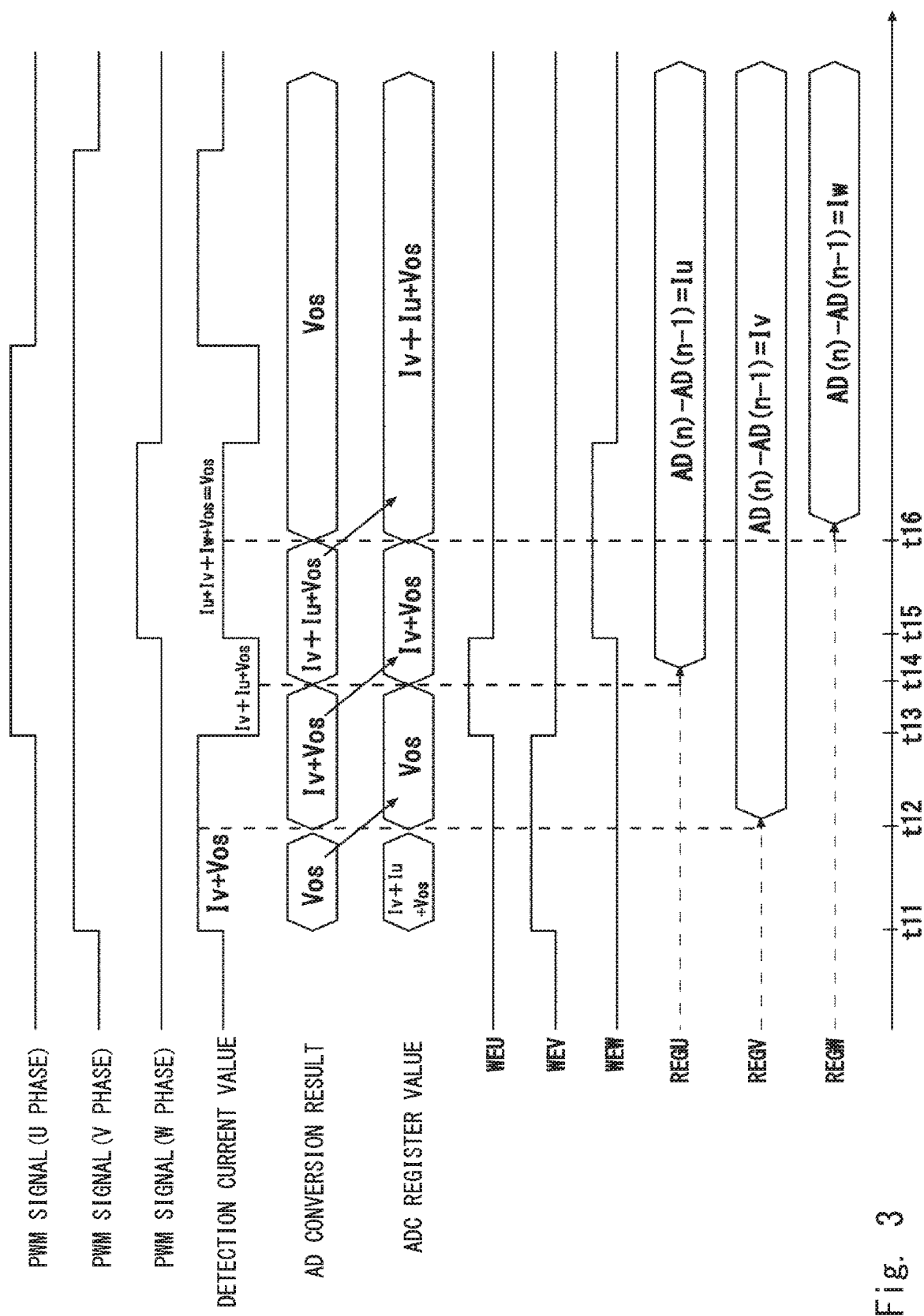
FIG. 3 is a timing chart related to an operation of the calculation apparatus according to the first embodiment.

Next, an operation for the calculation apparatus 200 to obtain the current value of each phase by storing the difference between the AD-converted current values will be described. FIG. 3 is a timing chart related to the operation of the calculation apparatus according to the first embodiment. In FIG. 3, the horizontal axis represents time and the vertical axis represents a level of each signal.

The PWM signals having three phases, which are the U phase, the V phase, and the W phase, are pulse width modulation signals for driving an object to be controlled (e.g., a brushless motor). The PWM signal is converted into a sinusoidal wave signal for driving the object to be controlled by an inverter or the like. As shown in FIG. 3, the PWM signal (V phase) rises at time t11. The encoder 201 detects a rising edge of the V phase PWM signal. Then, the encoder 201 outputs the result WEV of detecting the rising edge to the register 203-2.

Next, at time t12, the ADC register 204 stores an offset value Vos that has been AD-converted before the time t11. Then, the AD converter 202 AD-converts a current value Iv+Vos detected at time t12. The subtracted 205 subtracts the offset value Vos stored in the ADC register 204 from the current value Iv+Vos AD-converted by the AD converter 202. Then, the subtracted 205 outputs the obtained difference value Iv to the registers 203-1, 203-2, and 203-3.

In response to receiving both the result WEV of detecting the rising edge and a completion timing of the AD conversion, the register 203-2 stores the difference value Iv as REGV. On the other hand, as the registers 203-1 and 203-3 have not received the results WEU and WEW of detecting the rising edges, they do not store the difference value Iv.

Note that the time t12 may be any time between the time t11, at which the PWM signal (V phase) rises, and the time t13 when another PWM signal rises. Preferably, it is desirable that the time t12 be intermediate time between the time t11, at which the PWM signal (V phase) rises, and the time t13 when another PWM signal rises.

Next, at time the t13, the PWM signal (U phase) rises. The encoder 201 detects the rising edge of the U-phase PWM signal. Then, the encoder 201 outputs the result WEU of detecting the rising edge to the register 203-1.

Next, at time t14, the ADC register 204 stores the value Iv+Vos that has been AD-converted at time t12. Then, the AD converter 202 AD-converts a current value Iv+Iu+Vos detected at the time t14. The subtracted 205 subtracts the value Iv+Vos stored in the ADC register 204 from the current value Iv+Iu+Vos AD-converted by the AD converter 202. Then, the subtracted 205 outputs an obtained difference value Iu to the registers 203-1, 203-2, and 203-3.

In response to receiving both the result WEU of detecting the rising edge and the completion timing of the AD conversion, the register 203-1 stores the difference value Iu as REGU. On the other hand, as the registers 203-2 and 203-3 have not received the results WEV and WEW of detecting the rising edges, they do not store the difference value Iu.

Next, at time t15, the PWM signal (W phase) rises. The encoder 201 detects the rising edge of the PWM signal of the W phase. Then, the encoder 201 outputs the result WEW of detecting the rising edge to the register 203-3.

Next, at time t16, the ADC register 204 stores the value Iv+Iu+Vos that has been AD-converted at the time t14. Then, the AD converter 202 AD-converts a current value Iu+Iv+Iw+Vos(=Vos) detected at the time t16. The subtracted 205 subtracts the value Iv+Iu+Vos stored in the ADC register 204 from the current value Iu+Iv+Iw+Vos(=Vos) AD converted by the AD converter 202. Then, the subtracted 205 outputs an obtained difference value Iw to the registers 203-1, 203-2, and 203-3.

In response to receiving both the result WEW of detecting the rising edge and the completion timing of the AD conversion, the register 203-3 stores the difference value Iw as REGW. On the other hand, as the registers 203-1 and 203-2 have not received the results WEU and WEV of detecting the rising edges, they do not store the difference value Iw.

The detection value of the drive current of each phase can be obtained through the above operation.

As described above, the calculation apparatus according to the first embodiment stores the difference between the AD-converted current values, i.e., the value obtained by subtracting the previous AD-converted current value from the current AD-converted current value. This eliminates the need to evaluate which phase the detected current is in, thereby simplifying the calculation and shortening the control cycle. Further, development man-hours can be reduced and mounting can be easy.

Second Embodiment

Figure 4A:
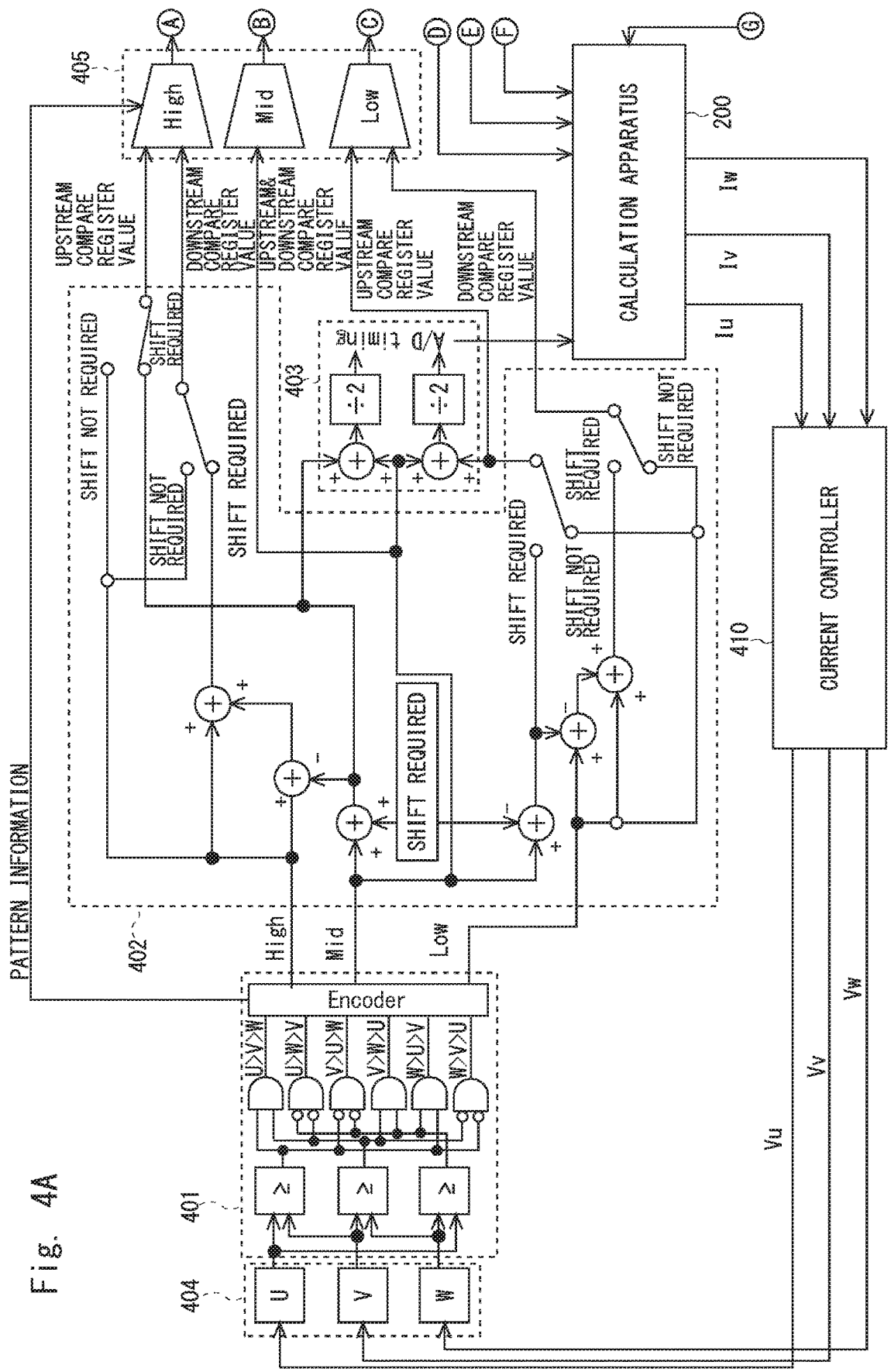
FIG. 4A is a block diagram showing a schematic configuration of a calculation apparatus according to a second embodiment.
Figure 4B:
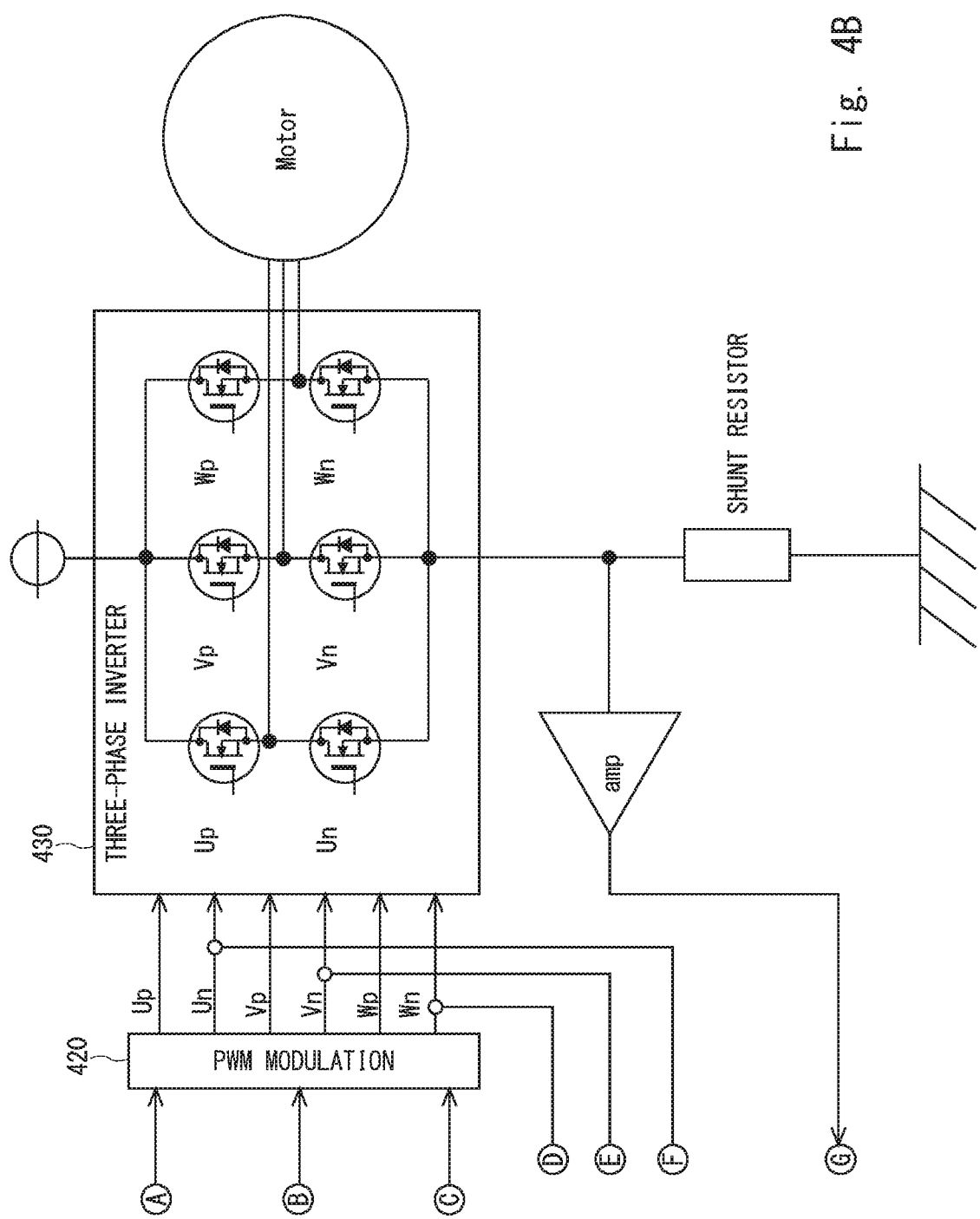
FIG. 4B is a block diagram showing a schematic configuration of a calculation apparatus according to a second embodiment.

In a second embodiment, a configuration of peripheral circuits of the calculation apparatus 100 will be described. FIGS. 4A and 4B are block diagrams showing an overview configuration of a calculation apparatus according to the second embodiment. In FIGS. 4A and 4B, the processing apparatus 400 includes a compare register rearrangement unit 401, an asymmetric PWM generator 402, an AD timing generator 403, a compare register 404, a compare register reverse rearrangement unit 405, a PWM modulator 420, a three-phase inverter 430, and a calculation apparatus 200.

The compare register 404 stores compare register values of the U phase, the V phase, and the W phase, which are set based on a command voltage output by the current controller 410. Each compare register value determines a toggle timing of each of U, V, and W phases in order to output PWM.

The compare register rearrangement unit 401 compares the compare register values stored in the three compare registers U, V, W (404) and decides the size relation between them. Then, the compare register rearrangement unit 401 rearranges the compare register values of the U phase, V phase, W phase compare register values in a descending order of the compare register values, and outputs them as High, Mid and Low in the descending order of the compare register values, respectively. That is, among the compare register values with the U phase, V phase, and W phase, the compare register rearrangement unit 401 outputs a signal having the largest value as High, outputs a signal having the second largest value as Mid, and outputs a signal having the smallest value as Low.

The asymmetric PWM generator 402 generates a High upstream compare register value, a High downstream compare register value, a Mid upstream and downstream compare register value, a Low upstream compare register value, and a Low downstream compare register value based on the size relation between the three compare register values and the input shift amount. Here, the upstream compare register value is a register value that determines a PWM toggle point at the time of up-counting when a PWM timer included in the PWM modulator 420 generates a PWM-generated carrier wave with a triangle wave. The downstream compare register value is a register value that determines a PWM toggle point at the time of down-counting when the PWM timer generates a PWM generated carrier wave with a triangle wave.

Specifically, the asymmetric PWM generator 402 of FIG. 4A uses a rising timing of the signal having the second largest compare register value (Mid) among the U, V, and W phase PWM compare registers as a reference to decide a rising timing of the signal having the largest compare register value (High) and a rising timing of the signal having the smallest compare register value (Low).

The compare register value having the second largest value is not changed and is used as the upstream and downstream compare register value.

For the largest compare register value, a value obtained by adding the shift amount to the second largest compare register value is used as the upstream compare register value, and a value obtained by subtracting the upstream compare register value from a value obtained by doubling the largest compare register value is used as the downstream compare register value.

For the smallest compare register value, a value obtained by subtracting the shift amount from the second largest compare register value is used as the upstream compare register value, and a value obtained by subtracting the upstream compare register value from a value obtained by doubling the smallest compare register value is used as the downstream compare register value. Note that the asymmetric PWM generator 402 does not change the duty of the PWM signal generated only by shifting the compare register value.

As described above, the asymmetric PWM generator 402 can correct the values of the respective compare registers according to the input shift amount and create a PWM pattern that has an enough current detection section. However, the values of the compare registers are corrected only when a control circuit (not shown) determines that a difference between High and Mid and a difference between Mid and Low, which are output from the compare register rearrangement unit 401, exceed the time required for the AD conversion.

When it is determined that there is enough time for the AD conversion, the upstream compare register values and downstream compare register values for High, Mid, and Low are generated using the compare register values output from the compare register rearrangement unit 401.

Figure 5:
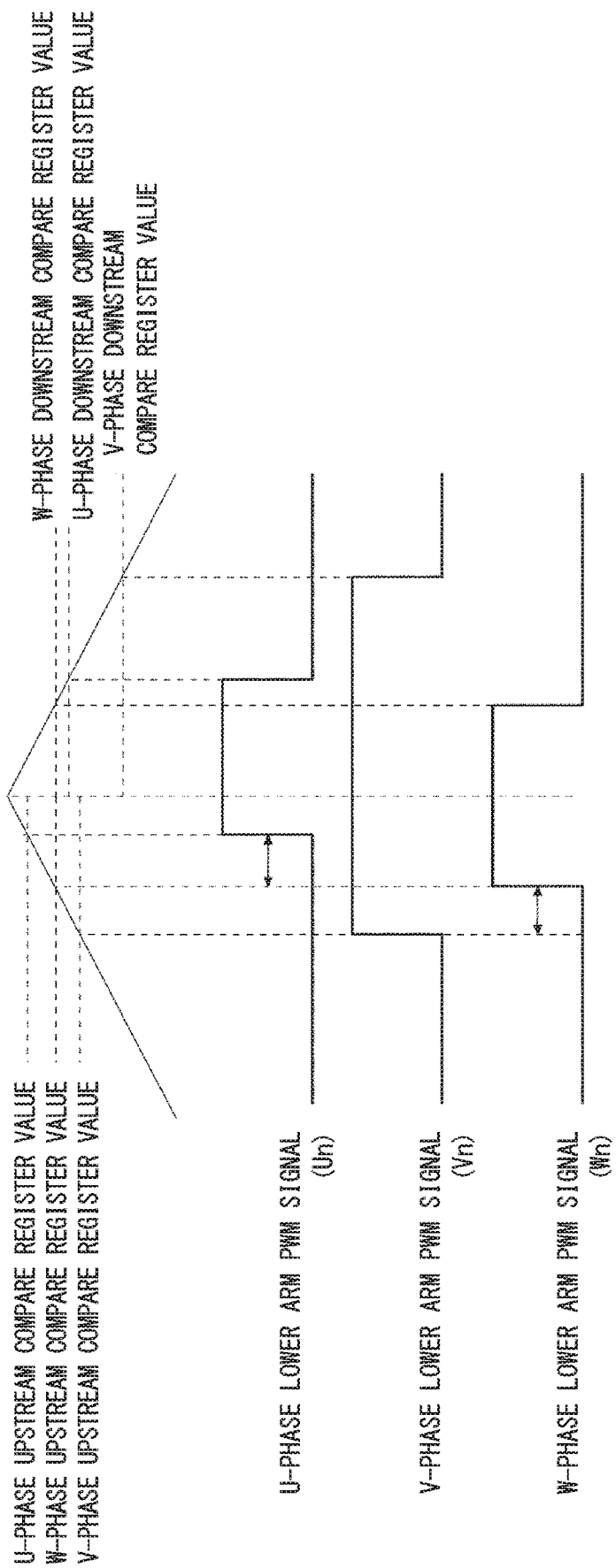
FIG. 5 is a timing chart related to a compare register in PWM shift.

That is, as shown in FIG. 5, the asymmetric PWM generator 402 sets a timing that is earlier than the rising timing of the signal having the second largest compare register value by a predetermined shift amount to the rising timing of the signal having the largest compare register timing. However, when the rising timing of the signal having the second largest compare register value (Mid) is apart from the rising timing of the signal having the largest compare register value (High) by much more than the predetermined shift amount, the asymmetric PWM generator 402 does not change the rising timing of the signal having the largest compare register value (High).

Then, the asymmetric PWM generator 402 sets a timing delayed from the rising timing of the signal having the second largest compare register value by a predetermined shift amount to the rising timing of the signal having the largest compare register value. However, when the rising timing of the signal (Mid) having the second largest compare register value is apart from the rising timing of the signal (Low) having the smallest compare register value by much more than the predetermined shift amount, the asymmetric PWM generator 402 does not change the rising timing of the signal having the smallest compare register value (Low).

In this way, the asymmetric PWM generator 402 creates a PWM pattern. In the asymmetric PWM generator 402 shown in FIG. 4A, by switching with a switch based on the determination of the control circuit (not shown), either one of the value obtained by adding the shift amount and the value not adding the shift amount Is output.

In response to pattern information from the compare register rearrangement unit 401, the compare register reverse rearrangement unit 405 associates the upstream compare register values and downstream compare register values corresponding to High, Mid, and Low, which are generated by the asymmetric PWM generator 402, with the U-phase, the V-phase, and the W-phase. In response to the compare register value associated with each phase, the PWM modulator 420 generates a control signal for the three-phase inverter 430.

By shifting the PWM only when necessary as shown above, it is possible to reduce a harmonic component of the voltage as compared with the case where the PWM is shifted at any time. Further, the asymmetric PWM generator 402 outputs the generated High upstream compare register value, the Mid upstream and downstream compare register value, and Low upstream compare register value to the AD timing generator 403.

The AD timing generator 403 sets an AD timing at the center of the current detection section according to the corrected value of the compare register. Setting the AD timing at the center of the current detection section in this manner achieves accurate current detection. Then, the AD timing generator 403 outputs the set AD timing to the calculation apparatus 200.

The calculation apparatus 200 stores the AD-converted current value for each phase at the AD timing at which the signals having respective phases rise and at which a current value of a drive signal of the motor obtained by the PWM signals is set, thereby obtaining a drive current value of each phase.

With the configuration described above, the processing apparatus 400 can obtain the drive current value of each phase and achieve motor control. Next, an operation of the processing apparatus 400 will be described. FIG. 5 is a timing chart related to the compare register at the time of PWM shift. In FIG. 5, the horizontal axis represents time and the vertical axis represents a level of each signal. The triangle wave in the upper part of FIG. 5 is a carrier wave for PWM generation and indicates a count value of the timer for one cycle of PWM. The lower part of FIG. 5 shows the PWM signals of the lower arm of each of the U-phase, V-phase, and W-phase.

Next, one shunt current detection will be described. The current value detected in the first embodiment (and the overview of the embodiments and the first embodiment) stored with one shunt current detection is preferably stored at the above-described timing.

Figure 6:
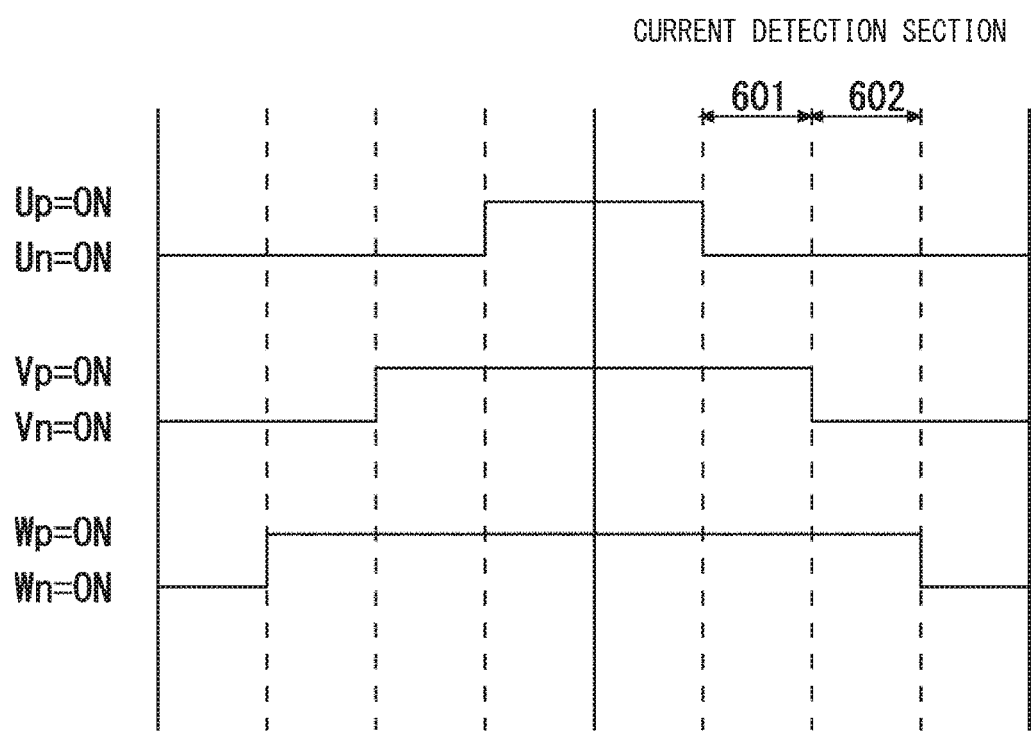
FIG. 6 is a timing chart showing an example of a current detection section in one shunt current detection method.

FIG. 6 is a timing chart showing an example of the current detection section in the one shunt current detection method. In FIG. 6, the horizontal axis represents time and the vertical axis represents a level of the PWM signal of each phase. In FIG. 6, a current detection section 601 indicates an open and close state of a switch element bridge of FIG. 7. Further, in FIG. 6, a current detection section 602 indicates an open and close state of a switch element bridge of FIG. 8.

For example, the AD timing generator 403 of FIG. 4A sets AD timings at the center of the periods in the current detection sections 601 and 602, respectively.

Figure 7:
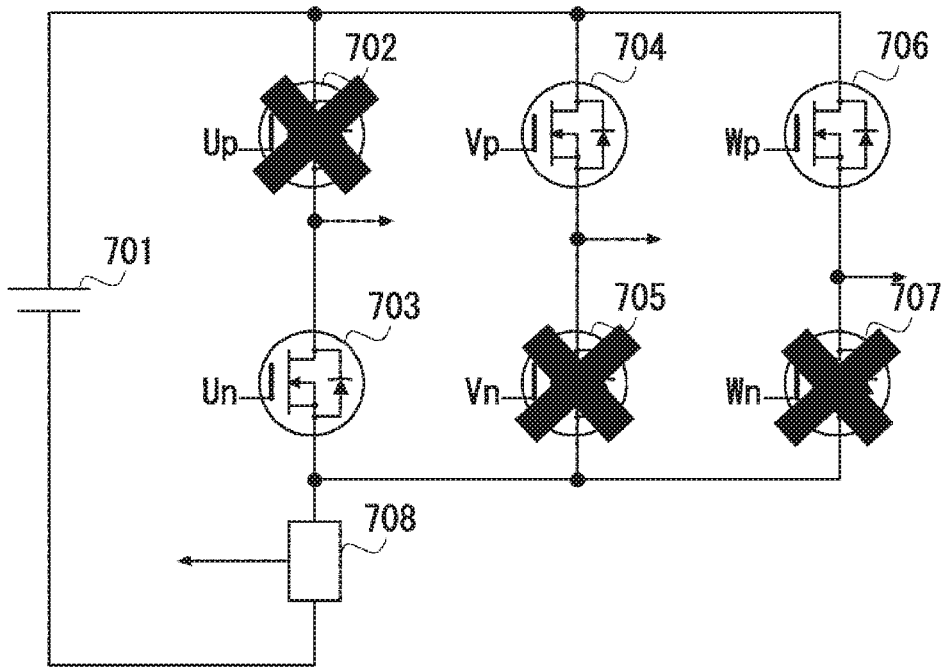
FIG. 7 is a circuit diagram showing an example of a switching pattern of one shunt current detection.

FIG. 7 is a circuit diagram showing an example of a switching pattern of one shunt current detection. As shown in FIG. 7, switch element bridges 703, 705, and 707 on the downstream side of the power supply 701 are bundled and connected to a ground (GND), and switch element bridges 702, 704, and 706 on the upstream side of the power supply 701 are bundled and connected to a DC power supply. Since the bus current flows to a common line (bus) on the ground side or the power supply side, it is detected by a current sensor 708. This method is referred to as the one shunt current detection method.

In the circuit shown in FIG. 7, the current sensor 708 is inserted between a connection of the bundled switch element bridges 703, 705, and 707 on the downstream side of the power supply 701 and the ground (GND) to detect bus current. The current sensor 708 may be inserted into the power supply side as described above. However, the current sensor 708 is preferably inserted into the GND side because the GND side has a lower level of voltage than that of the power supply side and thus circuit elements such as an amplifier can often be used.

For example, the current sensor 708 may be inserted between the resistor and the GND to amplify a voltage between both ends of the resistors by an amplifier and to thereby obtain a detection value in proportion to the bus current. Note that the current sensor 708 may use a magnetic method instead of a resistance method.

One of three phase current values can be detected according to the timing of opening and closing each of the upstream switch element bridges 702, 704, and 706 and the downstream switch element bridges 703, 705, and 707.

In FIG. 7, by closing the switch element bridges 703, 704 and 706, the current sensor 708 can detect the sum of the V-phase and W-phase drive current values (i.e., the U-phase current value).

Figure 8:
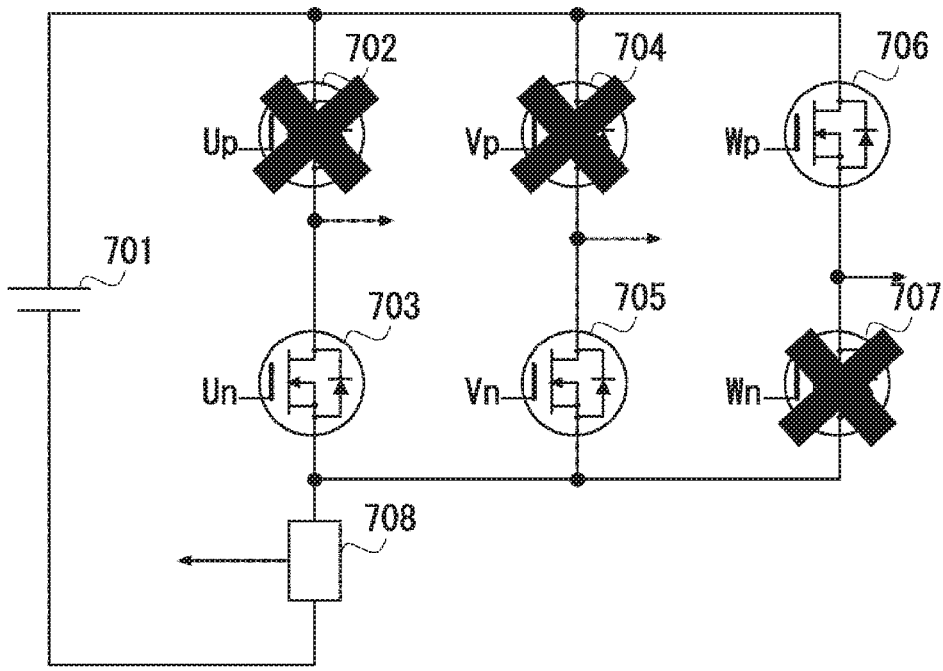
FIG. 8 is a circuit diagram showing an example of a switching pattern of one shunt current detection.

FIG. 8 is a circuit diagram showing an example of a switching pattern of one shunt current detection. In FIG. 8, by closing the switch element bridges 703, 705, and 706, the current sensor 708 can detect the drive current value of the W phase.

As described above, the processing apparatus according to the second embodiment stores the AD-converted current value for each phase at a timing after the PWM signals having at least three or more phases rise and after the AD conversion of the current value of the drive signal of the motor obtained by the PWM signals. By doing so, the calculation apparatus according to the second embodiment can obtain the drive current value of each phase by a small amount of calculation in a short time.

Further, the processing apparatus according to the second embodiment eliminates the need for a step of evaluating which phase the detected current is in, thereby making the calculation easier, reducing the development man-hours, and making the mounting easy.

Note that the above calculation and processing may be executed by a program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure made by the present inventors has been described in detail based on the embodiments, the present disclosure is not limited to the embodiments described above. It is obvious that various modifications can be made without departing from the scope of the present disclosure. For example, although the first and second embodiments have described the PWM signals having three-phases, they may be applied to PWM signals having four or more phases.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A calculation apparatus comprising:
    an encoder configured to detect rising edges of PWM signals having at least three or more phases in each of the phases;
    a register configured to store, at a timing after the PWM signals having the respective phases rise and after AD conversion of a current value of a drive signal of a motor obtained by the PWM signals, a difference value between the AD-converted current value and a previous AD-converted current value for each phase;
    an ADC register configured to store the previous AD-converted current value for each phase; and
    a subtracted configured to subtract the previous AD-converted current value from the AD-converted current value and obtain the difference value, wherein the register stores the difference value obtained by the subtracted.

2. The calculation apparatus according to claim 1, further comprising an AD converter configured to AD-convert the current value of the drive signal of the motor obtained by the PWM signals, wherein the register stores the current value AD-converted by the AD converter for each phase.

3. The calculation apparatus according to claim 2, further comprising a current sensor of a one shunt current detection method configured to detect current by switching current in a plurality of phases using one detection element, wherein the AD converter AD-converts the current value detected by the current sensor.

4. A processing apparatus comprising:
    a compare register rearrangement unit configured to compare PWM signals having at least three or more phases and determine a size relation among them;
    a PWM generator configured to generate a PWM pattern based on the size relation between the PWM signals;
    an AD timing generator configured to set a timing for AD conversion based on the PWM pattern; and
    a calculation apparatus comprising:
        an encoder configured to detect rising edges of PWM signals in each of the phases;
        a register configured to store, at a timing after the PWM signals having the respective phases rise and after the AD conversion of a current value of a drive signal of a motor obtained by the PWM signals, a difference value between the AD-converted current value and a previous AD-converted current value for each phase;
        an ADC register configured to store the AD-converted current value and the previous AD-converted current value for each phase; and
        a subtracted configured to subtract the previous AD-converted current value from the AD-converted current value and obtain a difference value, wherein the register stores the difference value obtained by the subtracted.

* * * * *